United States Patent
Takegami

(10) Patent No.: US 9,899,927 B2
(45) Date of Patent: Feb. 20, 2018

(54) CONTROL DEVICE AND CONTROL METHOD FOR POWER SUPPLY DEVICE

(71) Applicant: TDK Corporation, Tokyo (JP)

(72) Inventor: Eiji Takegami, Tokyo (JP)

(73) Assignee: TDK Corporation (JP)

(*) Notice: Subject to any disclaimer, the term of this patent is extended or adjusted under 35 U.S.C. 154(b) by 0 days.

(21) Appl. No.: 15/200,357

(22) Filed: Jul. 1, 2016

(65) Prior Publication Data
US 2017/0005582 A1    Jan. 5, 2017

(30) Foreign Application Priority Data

Jul. 2, 2015   (JP) ................................. 2015-133461

(51) Int. Cl.
H02M 3/335   (2006.01)
H02M 1/00   (2006.01)

(52) U.S. Cl.
CPC .............. H02M 3/33546 (2013.01); *H02M 2001/0009* (2013.01)

(58) Field of Classification Search
CPC ....... H02M 3/3356; H02M 2001/0009; H02M 3/33507; H02M 8/0491; H02J 3/387
USPC ..... 363/17, 20, 21.06, 21.18, 89, 90, 91, 95, 363/97, 131; 323/271, 276, 280, 282–288
See application file for complete search history.

(56) References Cited

U.S. PATENT DOCUMENTS

| | | | |
|---|---|---|---|
| 6,404,655 B1* | 6/2002 | Welches .............. | H02M 7/4807 363/17 |
| 7,064,967 B2* | 6/2006 | Ichinose ........... | H01M 8/04559 363/56.01 |
| 7,259,542 B2* | 8/2007 | Song .................. | H02J 7/34 323/282 |
| 7,615,887 B2* | 11/2009 | Stancu ................ | H02M 3/156 307/10.1 |
| 7,781,921 B2* | 8/2010 | Wang .................... | H02M 1/08 307/154 |
| 2005/0048337 A1* | 3/2005 | Matsubayashi ... | H01M 8/04604 702/60 |

(Continued)

FOREIGN PATENT DOCUMENTS

| | | |
|---|---|---|
| JP | 1995-219652 A | 8/1995 |
| JP | 4162546 B2 | 10/2008 |
| JP | 5185328 B2 | 4/2013 |

*Primary Examiner* — Rajnikant Patel
(74) *Attorney, Agent, or Firm* — Harness, Dickey & Pierce, P.L.C.

(57) ABSTRACT

A control device and method are provided for a power supply device which can perform stable constant voltage constant current control with high responsiveness with a simple configuration. The control device includes: a voltage difference value generation unit which subtracts an output voltage value from a voltage target value to generate a voltage difference value; a current difference value generation unit which subtracts an output current value from a current target value to generate a current difference value; a difference value selection unit which compares the voltage difference value or a value based on the voltage difference value with the current difference value or a value based on the current difference value, and selects the smaller one as a control difference value; and an operation amount generation unit which generates an operation amount for controlling the power supply device based on the control difference value.

20 Claims, 8 Drawing Sheets

(56) References Cited

U.S. PATENT DOCUMENTS

2011/0310637 A1    12/2011    Takegami

* cited by examiner

CONTROL DEVICE AND CONTROL METHOD FOR POWER SUPPLY DEVICE

BACKGROUND OF THE INVENTION

1. Field of the Invention

The present invention relates to a control device and a control method for a power supply device such as a DC/DC converter and an AC/DC converter, and more particularly to a control device and a control method for performing constant voltage constant current control.

2. Description of the Related Art

In the field of power supply such as a commercial power source, renewable energies like solar power generation and wind power generation are becoming widespread. Under the circumstances, a smart grid, a next-generation power infrastructure equipped with means for compensating mismatches between demand and supply through the use of secondary batteries, has been being built recently. In the field of automobiles, plug-in hybrid electric vehicles (PHEVs), electric vehicles (EVs), and the like of which secondary batteries can be charged with a commercial power source etc., as well as conventional hybrid vehicles (HVs) of which secondary batteries are charged by an engine, are growing rapidly in the market. The importance of the technique for storing electric power in a secondary battery is recognized once again, and research and development has been active in view of stable power supply and CO2 emission reduction.

Among such secondary batteries, lithium ion batteries are becoming mainstream instead of conventional lead batteries, nickel-cadmium batteries, nickel metal hydride batteries, etc. A lithium ion battery is high in energy density, small in size, and light in weight, and has no memory effect at high voltage. The lithium ion battery is characteristically prone to degradation if kept in a full charge state, and thus not suited for trickle charging. The lithium ion battery can possibly cause fire if overcharged. CVCC control, or constant voltage constant current control, for strictly managing both voltage and current is thus needed for charging. Specifically, control for preventing an overcharge and the like is performed, for example, by maintaining the charge current at a generally constant level (constant current control) in a low voltage state in an initial stage of charging, and maintaining the charge voltage at a generally constant level (constant voltage control) in a high-voltage state after the amount of charge has increased.

In the CVCC control, both the output voltage and the output current from the power supply need to be substantially simultaneously detected for feedback control. Control systems are broadly classified into two types, a cascade system and a parallel control system. In the cascade system, a CC control unit (constant current control unit) for performing CC control and a CV control unit (constant voltage control unit) for performing CV control are arranged in series. In the parallel control system, a CC control unit and a CV control unit are arranged in parallel. There are two types of cascade systems. One is a CV control minor loop/CV control major loop in which control is performed in order of CC control→CV control. The other is a CC control minor loop/CV control major loop in which control is performed in order of CV control→CC control.

The CV control minor loop/CV control major loop cascade system is mainly used to add a constant current control function to a commercially available constant voltage power supply device which is configured to be able to change its output voltage according to an external signal (for example, see Japanese Patent Application Laid-Open No. Hei 7-219652). A typical commercially available power supply device has an auxiliary function of changing its output voltage, called TRM function, PV function, VR function, etc., and is equipped with an input terminal of an external voltage adjustment signal. This terminal can be utilized to add a constant current function easily. Such a method is also described as an application in a catalog and the like.

FIG. 5 is a block diagram showing an example of a configuration of a CV control minor loop/CC control major loop cascade system.

The following description deals with an example where a single-transistor forward converter (DC/DC converter) having a known configuration is used as a power supply device 100. Specifically, the power supply device 100 includes a pair of input terminals 101, a pair of output terminals 102, a transformer 103, a switch 104, a driver 105, a rectifier circuit 106, a smoothing circuit 107, and an input capacitor 108. A direct-current voltage having an input voltage value of Vin is applied to the pair of input terminals 101. A load 200, such as a secondary battery, is connected to the pair of output terminals 102. The driver 105 switches on/off the switch 104 on the basis of a driving pulse P transmitted from a control device 110, whereby an output voltage value Vo and an output current value Io output to the load 200 are controlled.

The control device 110 of the CV control minor loop/CC control major loop cascade system includes a CC control unit 111, a CV control unit 112, and a driving pulse generation unit 113.

The CC control unit 111 compares a current target value Iref set by a target value setting unit 114 with the output current value Io detected by an output current detection unit 115. The CC control unit 111 then generates a voltage target value Vref by PID control or the like so that a current difference value ΔEi, which is a difference between the current target value Iref and the output current value Io, approaches zero. The voltage target value Vref is limited by a limiter 116 so as not to exceed a voltage target upper limit value V0ref set by the target value setting unit 114.

The CV control unit 112 compares the voltage target value Vref generated by the CC control unit 111 with the output voltage value Vo detected by an output voltage detection unit 117. The CV control unit 112 then generates an operation amount U by PID control or the like so that a voltage difference value ΔEv, which is a difference between the voltage target value Vref and the output voltage value Vo, approaches zero. The driving pulse generation unit 113 generates a driving pulse P by a PWM method for modulating a pulse width or the like on the basis of the operation amount U, and transmits the driving pulse P to the driver 105.

According to such a system, for example, in a low voltage state in an initial stage of charging where the output voltage value Vo is low, the voltage target value Vref is generated as a value for bringing the current difference value ΔEi close to zero. The control device 110 thus performs CC control. As the amount of charge increases, the output voltage value Vo increases. After the voltage target value Vref needed to bring the current different value ΔEi close to zero exceeds the voltage target upper limit value V0ref, the voltage target value Vref is maintained at the same value as the voltage target upper limit value V0ref by the limiter 116. The control device 110 consequently performs CV control.

A CC control minor loop/CV control major loop cascade system is implemented by interchanging the CC control unit 111 and the CV control unit 112 of the foregoing CV control minor loop/CC control major loop cascade system. The CC control minor loop/CV control major loop cascade system is applied to a bidirectional power supply device and the like for charging and discharging a secondary battery (for example, see Japanese Patent No. 5185328).

FIG. 6 is a block diagram showing an example of a configuration of the CC control minor loop/CV control major loop cascade system.

In such a system, the CV control unit 112 compares the voltage target value Vref set by the target value setting unit 114 with the output voltage value Vo detected by the output voltage detection unit 117. The CV control unit 112 generates the current target value Iref by PID control or the like so that the voltage difference value ΔEv, a difference between the voltage target value Vref and the output voltage value Vo, approaches zero. The current target value Iref is limited by the limiter 116 so as not to exceed a current target upper limit value I0ref set by the target value setting unit 114.

The CC control unit 111 compares the current target value Iref generated by the CV control unit 112 with the output current value Io detected by the output current detection unit 115. The CC control unit 111 generates the operation amount U by PID control or the like so that the current difference value ΔEi, a difference between the current target value Iref and the output current value Io, approaches zero. The driving pulse generation unit 113 generates the driving pulse P by a PWM method for modulating a pulse width or the like on the basis of the operation amount U, and transmits the driving pulse P to the driver 105.

According to such a method, in a state where the output current value Io is small, the current target value Iref is generated as a value for bringing the voltage difference value ΔEv close to zero. The control device 110 thus performs CV control. After the output current value Io increases and the current target value Iref needed to bring the voltage difference value ΔEv close to zero exceeds the current target upper limit value I0ref, the current target value Iref is maintained at the same value as the current target upper limit value I0ref by the limiter 116. The control device 110 consequently performs CC control.

In the parallel control system, the CC control unit 111 and the CV control unit 112 are arranged in parallel, and either one of CC control and CV control is performed selectively (for example, see Japanese Patent No. 4162546). FIG. 7 is a block diagram showing an example of a configuration of the parallel control system. In such a system, the control device 110 includes a target value selection unit 118 in addition to the CC control unit 111, the CV control unit 112, and the driving pulse generation unit 113. The CC control unit 111 compares the current target value Iref set by the target value setting unit 114 with the output current value Io detected by the output current detection unit 115. The CC control unit 111 generates a CC control operation amount Ui by PID control or the like so that the current difference value ΔEi, a difference between the current target value Iref and the output current value Io, approaches zero. Similarly, the CV control unit 112 compares the voltage target value Vref set by the target value setting unit 114 with the output voltage value Vo detected by the output voltage detection unit 117. The CV control unit 112 generates a CV control operation amount Uv by PID control or the like so that the voltage difference value ΔEv, a difference between the voltage target value Vref and the output voltage value Vo, approaches zero.

The target value selection unit 118 selects either one of the CC control operation amount Ui and the CV control operation amount Uv as the operation amount U. The driving pulse generation unit 113 generates the driving pulse P by a PWM method for modulating a pulse width or the like on the basis of the selected operation amount U, and transmits the driving pulse P to the driver 105. If the target value selection unit 118 selects the CC control operation amount Ui, the control device 110 performs CC control. If the target value selection unit 118 selects the CV control operation amount Uv, the control device 110 performs CV control.

In the conventional cascade systems, the target value of the minor loop is changed by the major loop. Suppose that the minor loop and the major loop have similar response speeds. In such a case, if the major loop changes the target value while the control of the minor loop is in operation, the control of the minor loop can become unstable. In the cascade systems, the response speed of the control of the major loop therefore needs to be sufficiently lower than that of the minor loop so that the target value will not vary during the control of the minor loop.

The responsiveness of the CC control is largely dependent on an impedance and the like of the load 200. If the CC control is the major loop, there can occur a problem due to the low response speed. To solve such a problem, the system needs to be tuned according to the state of the load 200. The result has been high costs and low versatility of the CV control minor loop/CC control major loop cascade system. If the CV control is the major loop, the response speed of the CV control, which is the most important to power supply devices, drops significantly. The uses of the CC control minor loop/CV control major loop cascade system have thus been limited to a bidirectional power supply device, a power factor improvement step-up converter, and the like of which high response speed is not needed.

In the parallel control system, the CC control unit 111 and the CV control unit 112 independently generate the CC control operation amount Ui and the CV control operation amount Uv, respectively. There occurs no problem like those of the cascade systems, and appropriate responsiveness can be provided both in the CC control and the CV control. However, according to the parallel control system, the CC control unit 111 and the CV control unit 112 constantly generate the CC control operation amount Ui and the CV control operation amount Uv regardless of which is selected as the operation amount U. There has thus been a problem of unstable control due to a change in the operation amount U when control is switched from CC control to CV control or from CV control to CC control.

Specifically, for example, during CC control, the output current value Io is close to the current target value Iref and the output voltage value Vo is deviated from the voltage target value Vref. The CV control operation amount Uv generated during the CC control is significantly greater than the CC control operation amount Ui mostly because of the influence of an integral operation. If the CC control is switched to CV control and the CV control operation amount Uv is selected as the control amount U, the output voltage and the output current vary greatly. There has thus been a problem that it takes long to converge to a stable state.

To address such a problem, the control method described in the foregoing Japanese Patent No. 4162546 includes cancelling the integral operation of the unselected control to provide stability at the time of switching of control. However, in the control method of the foregoing Japanese Patent No. 4162546, whether to cancel an integral operation needs to be determined on the basis of which of the CC control operation amount Ui and the CV control operation amount Uv is selected. There has thus been a problem of complicated control. Moreover, according to the control method of the foregoing Japanese Patent No. 4162546, the control circuit for generating the CC control operation amount Ui and the control circuit for generating the CV control operation amount Uv are separately provided. There has thus been a problem of increased installation space as well as an increase in the cost of the control device 110.

SUMMARY OF THE INVENTION

The present invention has been made in view of the aforementioned circumstances. It is an object of the present invention to provide a control device and a control method for a power supply device which can perform stable constant voltage constant current control with high responsiveness even with a simple configuration.

(1) The present invention provides a control device for a power supply device, the control device including: an output voltage detection unit configured to detect an output voltage value of the power supply device; a voltage target value setting unit configured to set a voltage target value serving as a target of the output voltage value; a voltage difference value generation unit configured to subtract the output voltage value from the voltage target value to generate a voltage difference value; an output current detection unit configured to detect an output current value of the power supply device; a current target value setting unit configured to set a current target value serving as a target of the output current value; a current difference value generation unit configured to subtract the output current value from the current target value to generate a current difference value; a difference value selection unit configured to compare the voltage difference value or a value based on the voltage difference value with the current difference value or a value based on the current difference value, and selecting a smaller one as a control difference value; and an operation amount generation unit configured to generate an operation amount for controlling the power supply device on the basis of the control difference value.

(2) The present invention also provides the control device for a power supply device according to the foregoing item (1), further including a filter unit configured to apply predetermined arithmetic processing to the current difference value to generate an adjusted current difference value, and wherein the difference value selection unit compares the voltage difference value with the adjusted current difference value.

(3) The present invention also provides the control device for a power supply device according to the foregoing item (1), further including a filter unit configured to apply predetermined arithmetic processing to the voltage difference value to generate an adjusted voltage difference value, and wherein the difference value selection unit compares the adjusted voltage difference value with the current difference value.

(4) The present invention also provides the control device for a power supply device according to the foregoing item (1), further including a filter unit configured to apply predetermined arithmetic processing to the voltage difference value and the current difference value to generate an adjusted voltage difference value and an adjusted current difference value, and wherein the difference value selection unit compares the adjusted voltage difference value with the adjusted current difference value.

(5) The present invention also provide the control device for a power supply device according to any one of the foregoing items (2) to (4), wherein the filter unit includes at least any one of a gain compensator configured to multiply a predetermined gain, a phase compensator configured to compensate a phase, and a gain adjuster configured to adjust a gain.

(6) The present invention also provides the control device for a power supply device according to the foregoing item (5), wherein the gain adjuster performs different types of gain compensation depending on a magnitude of an input value.

(7) The present invention also provides the control device for a power supply device according to the foregoing item (1), wherein the difference value selection unit compares the voltage difference value with the current difference value.

(8) The present invention also provides the control device for a power supply device according to any one of the foregoing items (1) to (7), wherein the operation amount generation unit is configured to generate the operation amount by a control system having at least one of characteristics of a proportional operation, an integral operation, and a differential operation.

(9) The present invention also provides a control method for a power supply device, the control method including: output voltage detection processing for detecting an output voltage value of the power supply device; voltage target value setting processing for setting a voltage target value serving as a target of the output voltage value; voltage difference value generation processing for subtracting the output voltage value from the voltage target value to generate a voltage difference value; output current detection processing for detecting an output current value of the power supply device; current target value setting processing for setting a current target value serving as a target of the output current value; current difference value generation processing for subtracting the output current value from the current target value to generate a current difference value; difference value selection processing for comparing the voltage difference value or a value based on the voltage difference value with the current difference value or a value based on the current difference value, and selecting a smaller one as a control difference value; and operation amount generation processing for generating an operation amount for controlling the power supply device on the basis of the control difference value.

According to the control device and the control method for a power supply device according to the present invention, an excellent effect that stable constant voltage constant current control can be performed with high responsiveness even with a simple configuration can be provided.

DETAILED DESCRIPTION OF THE PREFERRED EMBODIMENTS

An embodiment of the present invention will be described below with reference to the accompanying drawings.

Figure 1:
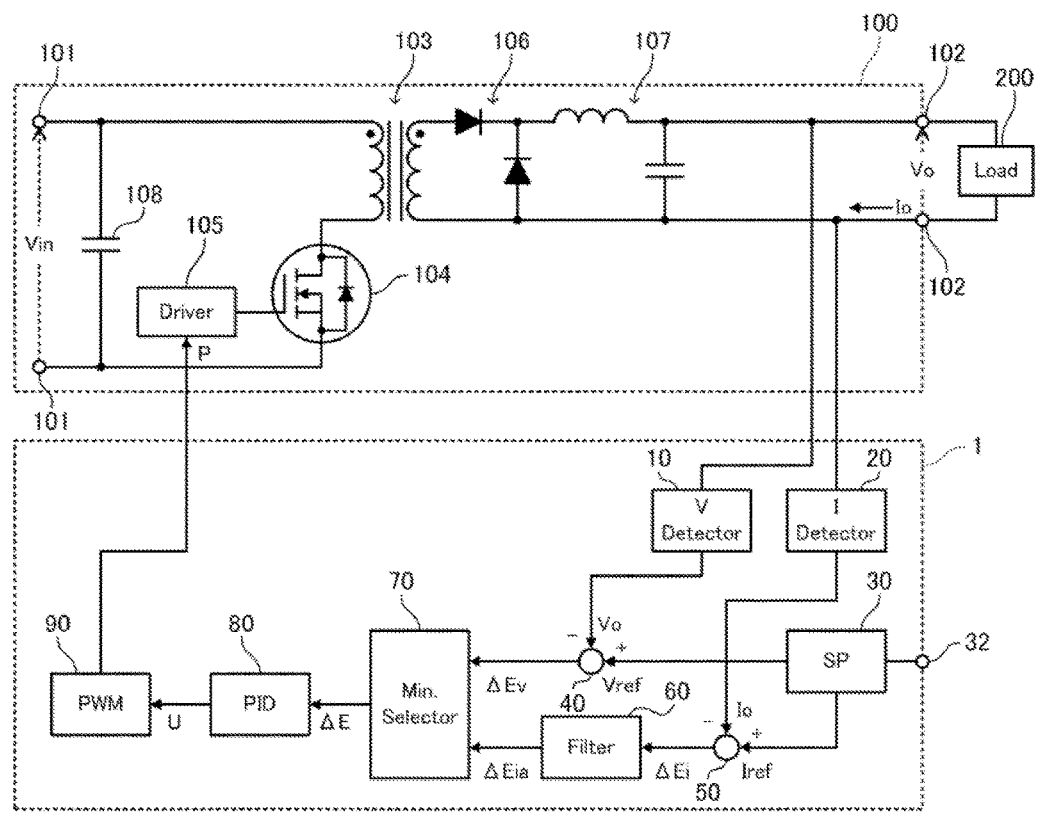
FIG. 1 is a block diagram showing a configuration of a control device for a power supply device according to an embodiment of the present invention.

FIG. 1 a block diagram showing a configuration of a control device 1 for a power supply device (hereinafter, referred to simply as a control device 1) according to the present embodiment. The control device 1 performs output CVCC control (constant voltage constant current control) on a power supply device 100 such as a DC/DC converter.

Like the foregoing conventional examples, the power supply device 100 according to the present embodiment is a single-transistor forward converter including a known configuration. Specifically, the power supply device 100 includes a pair of input terminals 101, a pair of output terminals 102, a transformer 103, a switch 104, a driver 105, a rectifier circuit 106, a smoothing circuit 107, and an input capacitor 108. A direct-current voltage having an input voltage value of Vin is applied to the pair of input terminals 101. A load 200, such as a secondary battery, is connected to the pair of output terminals 102. The driver 105 switches on/off the switch 104 on the basis of a driving pulse P transmitted from the control device 1, whereby an output voltage value Vo and an output current value Io output to the load 200 are controlled.

It will be understood that the power supply device 100 may be a DC/DC converter of different configuration or an AC/DC converter. For example, the power supply device 100 may be either insulated or non-insulated. The power supply device 100 may have any of step-down (back converter), step-up (boost converter), and step-up/down (back boost converter) voltage conversion ratios. The oscillation system of the power supply device 100 may be either self-exited or separately excited. The control system of the power supply device 100 may be any of PWM control, PFM control, and phase shift control. The conversion unit of the power supply device 100 may have any of flyback, forward, half bridge, full bridge, and push-pull configurations.

The control device 1 includes an appropriate microcontroller (MCU) and the like. As shown in FIG. 1, the control device 1 includes an output voltage detection unit 10, an output current detection unit 20, a target value setting unit 30, a voltage difference value generation unit 40, a current difference value generation unit 50, a filter unit 60, a difference value selection unit 70, an operation amount generation unit 80, and a driving pulse generation unit 90.

The output voltage detection unit 10 detects the output voltage value Vo of the power supply device 100. Specifically, the output voltage detection unit 10 includes a level converter and an analog-to-digital converter (ADC). The output voltage detection unit 10 converts the output voltage value Vo into a digital signal having a level capable of comparison with a voltage target value Vref, and transmits the digital signal to the voltage difference value generation unit 40. To avoid malfunction and the like due to noise, the output voltage detection unit 10 may include an RC phase compensator including a resistor and a capacitor.

The output current detection unit 20 detects the output current value Io of the power supply device 100. Specifically, the output current detection unit 20 includes a current-to-voltage converter (IVC), a level converter, and an ADC. The output current detection unit 20 converts the output current value Io into a digital signal having a level capable of comparison with a current target value Iref, and outputs the digital signal to the current difference value generation unit 50. The IVC includes a resistive element, a Hall element, or the like if the current is detected in a position where a direct current flows, such as the output terminals 102. The IVC includes a resistive element, a Hall element, a current transformer, or the like if the current is detected in a position where an alternating current flows or where an alternating current is superposed on a direct current. Like the output voltage detection unit 10, the output current detection unit 20 may include an RC phase compensator.

The target value setting unit 30 sets the voltage target value Vref which serves as a target of the output voltage value Vo and the current target value Iref which serves as a target of the output current value Io. The target value setting unit 30 includes a terminal 32 for receiving a signal from outside. On the basis of the signal received via the terminal 32, the target value setting unit 30 generates the voltage target value Vref to be compared with the output voltage value Vo and the current target value Iref to be compared with the output current value Io. The target value setting unit 30 transmits the generated voltage target value Vref and current target value Iref to the voltage difference value generation unit 40 and the current difference value generation unit 50.

To prevent malfunction due to noise and avoid an overshoot and the like when the voltage target value Vref or the current target value Iref is changed, the target value setting unit 30 may include an RC phase compensator. The target value setting unit 30 may include storing means such as a ROM and a RAM, and set the voltage target value Vref or the current target value Iref on the basis of information stored in the storing means. Target value setting units 30 may be separately provided for the voltage target value Vref and the current target value Iref.

The voltage difference value generation unit 40 generates a voltage difference value ΔEv which is a difference between the voltage target value Vref and the output voltage value Vo. Specifically, the voltage difference value generation unit 40 includes a subtractor or the like, and subtracts the output voltage value Vo from the voltage target value Vref to generate the voltage difference value ΔEv. The voltage difference value generation unit 40 transmits the generated voltage difference value ΔEv to the difference value selection unit 70. If the output voltage value Vo is greater than the voltage target value Vref, the voltage difference value generation unit 40 generates a negative voltage difference value ΔEv.

The current difference value generation unit 50 generates a current difference value ΔEi which is a difference between the current target value Iref and the output current value Io. Specifically, the current difference value generation unit 50 includes a subtractor or the like, and subtracts the output current value Io from the current target value Iref to generate the current difference value ΔEi. The current difference value generation unit 50 transmits the generated current difference value ΔEi to the filter unit 60. If the output current value Io is greater than the current target value Iref, the current difference value generation unit 50 generates a negative current difference value ΔEi.

The filter unit 60 performs gain compensation and phase compensation to adjust responsiveness of CC control. Specifically, the filter unit 60 applies predetermined arithmetic processing to the current difference value ΔEi to generate an adjusted current difference value ΔEia, and transmits the adjusted current difference value ΔEia to the difference value selection unit 70. The control device 1 performs both CV control and CC control by using one operation amount generation unit 80. The filter unit 60 is then provided to keep the responsiveness of the CV control and that of the CC control in balance even if the output voltage value Vo and the output current value Io have a large difference in level. Details will be described later. The provision of the filter unit 60 also enables an adjustment of the magnitude of the difference value for the difference value selection unit 70 to compare, whereby the occurrence of mutual interference between the CV control and the CC control can be prevented.

Figure 2:
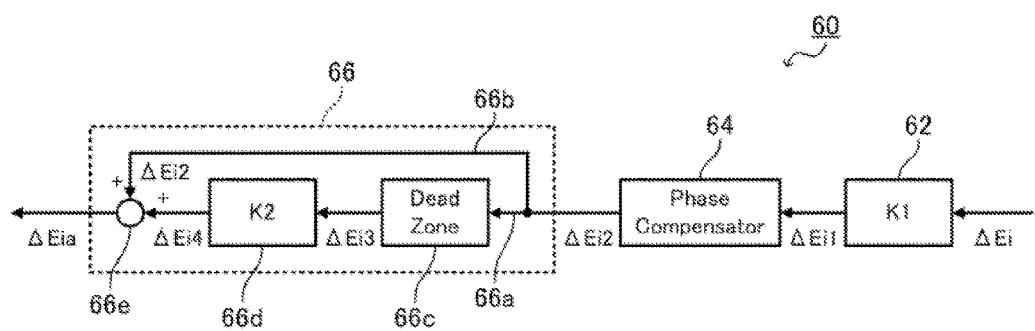
FIG. 2 is a block diagram showing a configuration of a filter unit.

FIG. 2 is a block diagram showing a configuration of the filter unit 60. As shown in FIG. 2, the filter unit 60 includes a gain compensator 62, a phase compensator 64, and a gain adjuster 66.

The gain compensator 62 performs gain compensation by multiplying the current difference value $\Delta Ei$ by a predetermined gain K1. The gain compensator 62 transmits the gain-compensated, primary adjusted current difference value $\Delta Ei1 = K1 \Delta Ei$ to the phase compensator 64. The phase compensator 64 performs phase compensation by applying phase-compensating arithmetic processing to the primary adjusted current difference value $\Delta Ei1$. The phase compensator 64 transmits the phase-compensated, secondary adjusted current difference value $\Delta Ei2$ to the gain adjuster 66. An example of the calculation formula for the phase compensation is $\Delta Ei2(n+1) = \alpha\{\Delta Ei1(n) - \Delta Ei2(n)\} + \Delta Ei2(n)$. Here, $\Delta Ei2(n+1)$ represents $\Delta Ei2$ at the (n+1)th feedback. $\Delta Ei1(n)$ and $\Delta Ei2(n)$ represent $\Delta Ei1$ and $\Delta Ei2$ at the nth feedback, respectively. $\alpha$ is a predetermined constant. The gain adjuster 66 performs different types of gain compensation on the basis of the magnitude of the secondary adjusted current difference value $\Delta Ei2$.

Specifically, the gain adjuster 66 includes a main path 66a, a branch 66b, a dead zone 66c, an auxiliary gain compensator 66d, and an adder 66e. The dead zone 66c and the auxiliary gain compensator 66d are arranged on the main path 66a. The adder 66e is arranged to connect the main path 66a and the branch 66b. The main path 66a is a path for applying predetermined arithmetic processing by the dead zone 66c and the auxiliary gain compensator 66d to the secondary adjusted current difference value $\Delta Ei2$ and transmitting the resultant to the adder 66e. The branch 66b is a path for simply transmitting the secondary adjusted current difference value $\Delta Ei2$ to the adder 66e.

The dead zone 66c is configured to interrupt the signal if the secondary adjusted current difference value $\Delta Ei2$ is smaller than or equal to a predetermined threshold Vth. If the secondary adjusted current difference value $\Delta Ei2$ is greater than the threshold Vth, the dead zone 66c transmits a tertiary adjusted current difference value $\Delta Ei3 = \Delta Ei2 - Vth$, obtained by subtracting the threshold Vth from the secondary adjusted current difference value $\Delta Ei2$, to the auxiliary gain compensator 66d. The auxiliary gain compensator 66d transmits a quaternary adjusted current difference value $\Delta Ei4 = K2 \Delta Ei3$, obtained by multiplying the tertiary adjusted current difference value $\Delta Ei3$ by a predetermined gain K2, to the adder 66e. The adder 66e adds the signal from the auxiliary gain compensator 66d of the main path 66a and the signal from the branch 66b, and transmits the resultant to the difference value selection unit 70.

Consequently, if the secondary adjusted current difference value $\Delta Ei2$ is greater than the predetermined threshold Vth, the adder 66e transmits the sum of the quaternary adjusted current difference value $\Delta Ei4$ from the auxiliary gain compensator 66d and the secondary adjusted current difference value $\Delta Ei2$ to the difference value selection unit 70 as the adjusted current difference value $\Delta Eia$. If the secondary adjusted current difference value $\Delta Ei2$ is smaller than or equal to the predetermined threshold Vth, the adder 66e transmits the secondary adjusted current difference value $\Delta Ei2$ to the difference value selection unit 70 as the adjusted current difference value $\Delta Eia$ since the dead zone 66c interrupts the signal.

The order of arrangement of the gain compensator 62, the phase compensator 64, and the gain adjuster 66 in the filter unit 60 is not limited to the example shown in FIG. 2. The gain compensator 62, the phase compensator 64, and the gain adjuster 66 may be arranged in different order. The dead zone 66c may interrupt the signal if the secondary adjusted current difference value $\Delta Ei2$ is greater than or equal to the predetermined value Vth. If the secondary adjusted current difference value $\Delta Ei2$ is smaller than the predetermined value Vth, the dead zone 66c may transmit the third adjusted current difference value $\Delta Ei3$, obtained by subtracting the threshold Vth from the secondary adjusted current difference value $\Delta Ei2$, to the auxiliary gain compensator 66d. The threshold Vth of the dead zone 66c may be set with hysteresis.

Returning to FIG. 1, the difference value selection unit 70 selects the smaller one between the voltage difference value $\Delta Ev$ and the adjusted current difference value $\Delta Eia$. Specifically, the difference value selection unit 70 includes an appropriate selector. The difference value selection unit 70 compares the voltage difference value $\Delta Ev$ with the adjusted current difference value $\Delta Eia$, and transmits the smaller one to the operation amount generation unit 80 as a control difference value $\Delta E$.

The operation amount generation unit 80 generates an operation amount U for controlling the output of the power supply device on the basis of the control difference value $\Delta E$. In the present embodiment, the control device 1 controls on/off the switch 104 included in the power supply device 100 by a PWM (pulse width modulation) method. The operation amount generation unit 80 therefore generates an on/off duty ratio of the switch 104 as the operation amount U. Specifically, the operation amount generation unit 80 includes a PID controller which makes a proportional operation (P), an integral operation (I), and a differential operation (D). The operation amount generation unit 80 generates the operation amount U by PID control so that the difference value $\Delta E$ approaches zero, and transmits the operation amount U to the driving pulse generation unit 90.

If the voltage difference value $\Delta Ev$ is selected as the control difference value $\Delta E$, the operation amount generation unit 80 generates the operation amount U so that the voltage difference value $\Delta Ev$ approaches zero. If the adjusted current difference value $\Delta Eia$ is selected as the control difference value $\Delta E$, the operation amount generation unit 80 generates the operation amount U so that the adjusted current difference value $\Delta Eia$ approaches zero. In other words, the control device 1 performs both the CV control and CC control, of which response characteristics are typically different, by using one operation amount generation unit 80.

For such a reason, in the present embodiment, the filter unit 60 is provided as described above and the responsiveness of the CC control is adjusted by the filter unit 60. The operation amount generation unit 80 can thus be tailored and optimized for the CV control. The optimization of the operation amount generation unit 80 for the CV control facilitates providing appropriate responsiveness of the CV control which is the most important to the power supply device 100. Since the control device 1 can be constructed by utilizing an existing PID controller for typical CV control etc., the cost of the control device 1 can be reduced.

The adjustment by the filter unit 60 can facilitate adjusting the responsiveness of the CC control which is largely dependent on the state of the load 200. This can also prevent an adjustment to the responsiveness of the CC control from affecting the responsiveness of the CV control. In other words, the control device 1 according to the present embodiment can easily balance the responsiveness of the CV control and that of CC control. In addition, the filter unit 60 can be appropriately set to prevent problems such as malfunction and oscillation due to noise in the CC control.

The operation amount generation unit 80 may generate the operation amount U by various control systems other than the PID control. For easy and stable execution of the CV control and CC control, the operation amount generation unit 80 preferably generates the operation amount by a control system having at least one of the characteristics of a proportional operation, an integral operation, and a differential operation, more preferably by a control system having at least two of the characteristics of a proportional operation, an integral operation, and a differential operation, and most preferably by a control system having all the characteristics of a proportional operation, an integral operation, and a differential operation.

The driving pulse generation unit 90 generates the driving pulse P for switching on/off the switch 104 included in the power supply device 100 on the basis of the operation amount U. The driving pulse generation unit 90 transmits the driving pulse P to the driver 105 for driving the switch 104. Specifically, the driving pulse generation unit 90 includes a PWM generator which generates the driving pulse P by a PWM method. The driving pulse generation unit 90 generates a driving pulse P the pulse width of which is modulated on the basis of the operation amount U, and transmits the driving pulse P to the driver 105. The driver 105 drives the switch 104 according to the driving pulse P. The switch 104 is thus switched on/off with the duty ratio based on the operation amount U, whereby the output of the power supply device 100, i.e., the output voltage value Vo and the output current value Io are controlled.

The driving pulse generation unit 90 may generate the driving pulse P by a PFM (pulse frequency modulation) method in which the frequency of the driving pulse P is modulated on the basis of the operation amount U. In such a case, the operation amount generation unit 80 may be configured to generate the on/off frequency of the switch 104 as the operation amount U. The driving pulse generation unit 90 may generate the driving pulse P by appropriately switching the PWM method and the PFM method. The driving pulse generation unit 90 may be configured to generate the driving pulse P by the PWM method if the operation amount U generated by the operation amount generation unit 80 is a duty ratio, and generate the driving pulse P by the PFM method if the operation amount U generated is a frequency.

Next, a control operation of the control device 1 will be described. With the foregoing configuration, the control device 1 detects the output voltage value Vo and the output current value Io. The control device 1 subtracts the output voltage value Vo and the output current value Io from the voltage target value Vref and the current target value Iref to generate the voltage difference value $\Delta Ev$ and the current difference value $\Delta Ei$. The control device 1 further performs gain compensation and phase compensation on the current difference value $\Delta Ei$ to generate the adjusted current difference value $\Delta Eia$. If the voltage difference value $\Delta Ev$ is smaller than the adjusted current difference value $\Delta Eia$, the control device 1 selects the voltage difference value $\Delta Ev$ as the control difference value $\Delta E$ for generating the operation amount U. If the adjusted current difference value $\Delta Eia$ is smaller than the voltage difference value $\Delta Ev$, the control device 1 selects the adjusted current difference value $\Delta Eia$ as the control difference value $\Delta E$ for generating the operation amount U.

Consequently, if the voltage difference value $\Delta Ev$ is smaller than the adjusted current difference value $\Delta Eia$, the control device 1 generates the operation amount U so that the voltage difference value $\Delta Ev$ approaches zero. The control device 1 then transmits the driving pulse P having a duty ratio based on the operation amount U to the power supply device 100. That is, if the voltage difference value $\Delta Ev$ is smaller than the adjusted current difference value $\Delta Eia$, the control device 1 performs CV control so that the output voltage value Vo is maintained at the voltage target value Vref.

If the adjusted current difference value $\Delta Eia$ is smaller than the voltage difference value $\Delta Ev$, the control device 1 generates the operation amount U so that the adjusted current difference value $\Delta Eia$ approaches zero. The control device 1 then transmits the driving pulse P having a duty ratio based on the operation amount U to the power supply device 100. That is, if the adjusted current difference value $\Delta Eia$ is smaller than the voltage difference value $\Delta Ev$, the control device 1 performs CC control so that the output current value Io is maintained at the current target value Iref.

Figure 3:
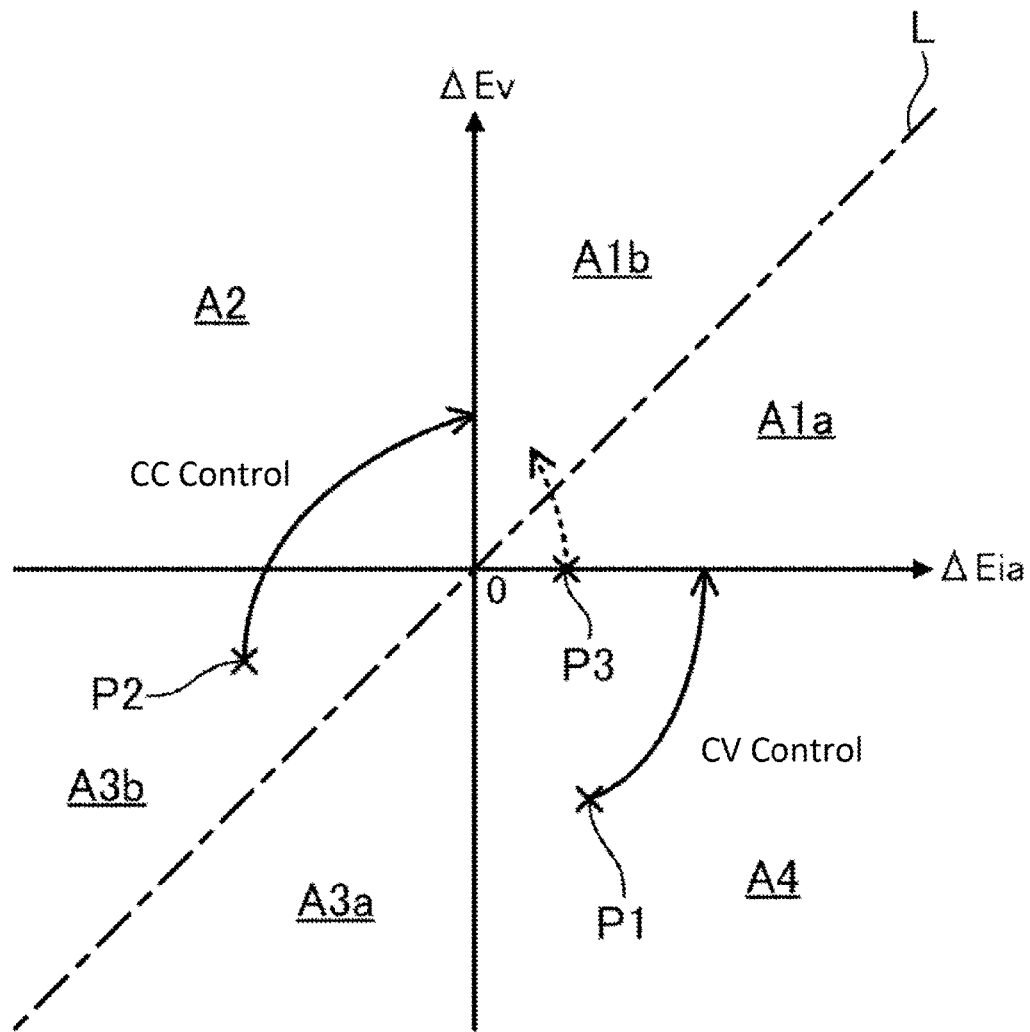
FIG. 3 is a chart schematically showing a control operation of the control device.

FIG. 3 is a chart schematically showing the control operation of the control device 1. FIG. 3 shows a two-dimensional space with the voltage difference value $\Delta Ev$ on the vertical axis and the adjusted current difference value $\Delta Eia$ on the horizontal axis. The line L shown by the dashed-dotted line represents a line of $\Delta Ev=\Delta Eia$.

Suppose that the output state of the power supply device 100 lies in an area below the line L, specifically, in an area A1$a$ in the first quadrant, an area A3$a$ in the third quadrant, or an area A4 that is the entire fourth quadrant. In such a case, the control device 1 performs CV control since the voltage difference value $\Delta Ev$ is smaller than the adjusted current difference value $\Delta Eia$. For example, if the output state of the power supply device 100 at the start of control is at point P1, the control device 1 generates the operation amount U by CV control so that the voltage difference value $\Delta Ev$ approaches zero. The output state of the power supply device 100 moves toward the horizontal axis as shown by the solid-lined arrow. The state in which the output state of the power supply device 100 generally falls on a positive range of the horizontal axis, i.e., where $\Delta Ev \approx 0$ and $\Delta Eia>0$ is the steady operation state of CV control.

Suppose that the output state of the power supply device 100 lies in an area above the line L, specifically, in an area A1$b$ in the first quadrant, an area A2 that is the entire second quadrant, or an area A3$b$ in the third quadrant. In such a case, the control device 1 performs CC control since the adjusted current difference value $\Delta Eia$ is smaller than the voltage difference value $\Delta Ev$. For example, if the output state of the power supply device 100 at the start of control is at point P2, the control device 1 generates the operation amount U by CC control so that the adjusted current difference value $\Delta Eia$ approaches zero. The output state of the power supply device 100 thus moves toward the vertical axis as shown by the solid-lined arrow. The state in which the output state of the power supply device 100 generally falls on a positive range of the vertical axis, i.e., where $\Delta Eia \approx 0$ and $\Delta Ev>0$ is the steady operation state of CC control.

If the output state of the power supply device 100 is in the area A3a or A4 or in the area A2 or A3b, the voltage difference value ΔEv or the adjusted current difference value ΔEia has a negative value. The control device 1 then decreases the value of the operation amount U to reduce the pulse width of the driving pulse P and reduce the duty ratio of the on state of the switch 104. If the output state of the power supply device 100 is in the area A1a or the area A1b, the voltage difference value ΔEv or the adjusted current difference value ΔEia has a positive value. The control device 1 then increases the value of the operation amount U to increase the pulse width of the driving pulse P and increase the duty ratio of the on state of the switch 104.

In the steady operation state of CV control, the output voltage value Vo is usually approximately equal to the voltage target value Vref and the output current value Io is deviated from the current target value Iref. The voltage difference value ΔEv is thus smaller than the adjusted current difference value ΔEia. In the steady operation state of CC control, the output current value Io is usually approximately equal to the current target value Iref and the output voltage value Vo is deviated from the voltage target value Vref. The adjusted current difference value ΔEia is thus smaller than the voltage difference value ΔEv.

Consequently, in the steady operation state of CV control, the control device 1 selects in principle the voltage difference value ΔEv as the control difference value ΔE. In the steady operation state of CC control, the control device 1 selects the adjusted current difference value ΔEia as the control difference value ΔE. That is, the control device 1 can stably maintain a steady operation state both in CV control and CC control.

The output state of the power supply device 100 in a steady operation state may sometimes come to a position near the origin. Specifically, the adjusted current difference value ΔEia may be small in the steady operation state of CV control. The voltage difference value ΔEv may be small in the steady operation state of CC control. In such cases, the output state is more likely to move beyond the line L due to reasons such as an abrupt change in the state of the load 200. For example, suppose that the output state of the power supply device 100 in the steady operation state of CV control is at point P3 shown in FIG. 3. If the output voltage value Vo or the output current value Io varies due to an abrupt change in the state of the load 200 or the like, the output state can move beyond the line L as shown by the broken-lined arrow because of a short distance to the line L.

If the output state of the power supply device 100 thus moves beyond the line L, the control device 1 performs CC control even in a situation where CV control is supposed to be performed. The control device 1 will not return to CV control until the voltage difference value ΔEv becomes smaller than the adjusted current difference value ΔEia as a result of the CC control. In the CC control, the adjusted current difference value ΔEia is controlled to approach zero regardless of a change in the voltage difference value ΔEv. This causes a delay with respect to a decrease in the voltage difference value ΔEv, and the control device 1 takes long to return to the steady operation state of CV control. In other words, the output voltage value Vo is not able to be maintained at the voltage target value Vref for a certain period after the abrupt change in the state of the load 200, and the stability of the CV control is impaired.

To address such a problem, in the present embodiment, the magnitude of the adjusted current difference value ΔEia can be adjusted by the setting of the filter unit 60, so that the output state of the power supply device 100 in the steady operation state is separated from the origin as appropriate. More specifically, in the present embodiment, the balance between the magnitude of the adjusted current difference value ΔEia and that of the voltage difference value ΔEv can be adjusted by the setting of the filter unit 60. The value of the adjusted current difference value ΔEia in the steady operation of CV control and the value of the voltage difference value ΔEv in the steady operation state of CC control can thus be adjusted to appropriate magnitudes, so that the output state is less likely to go beyond the line L.

Consequently, in the present embodiment, the stability of the CV control and CC control can be easily secured. Since the output state of the power supply device 100 is made less likely to go beyond the line L, chattering and other problems at the time of switching between the CV control and CC control can also be avoided. The configuration of the filter unit 60 is not limited to that shown in FIG. 2. An appropriate configuration according to the specifications, intended use, and the like of the power supply device 100 may be employed. For example, the filter unit 60 may include only one or two of the gain compensator 62, the phase compensator 64, and the gain adjuster 66. The filter unit 60 may apply arithmetic processing different from gain compensation or phase compensation to the current difference value ΔEi.

Figure 4A:
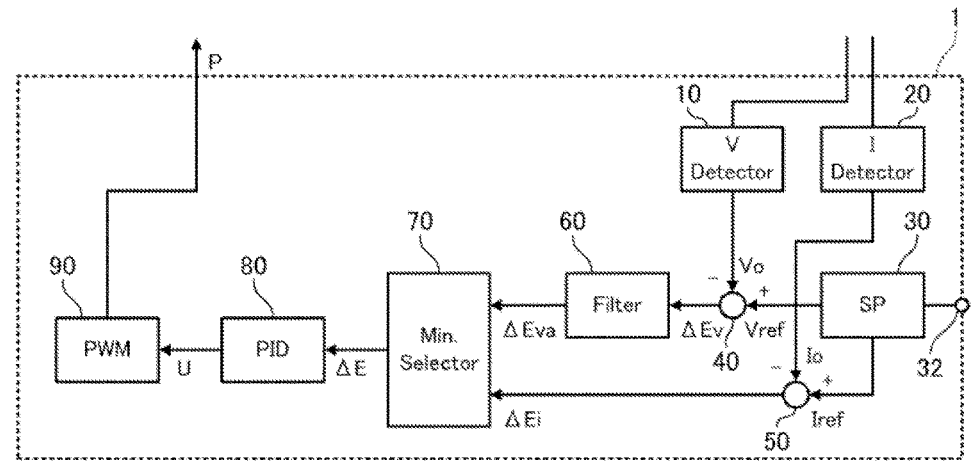
FIGS. 4A to 4C are block diagrams showing examples of other modes of the control device.
Figure 4B:
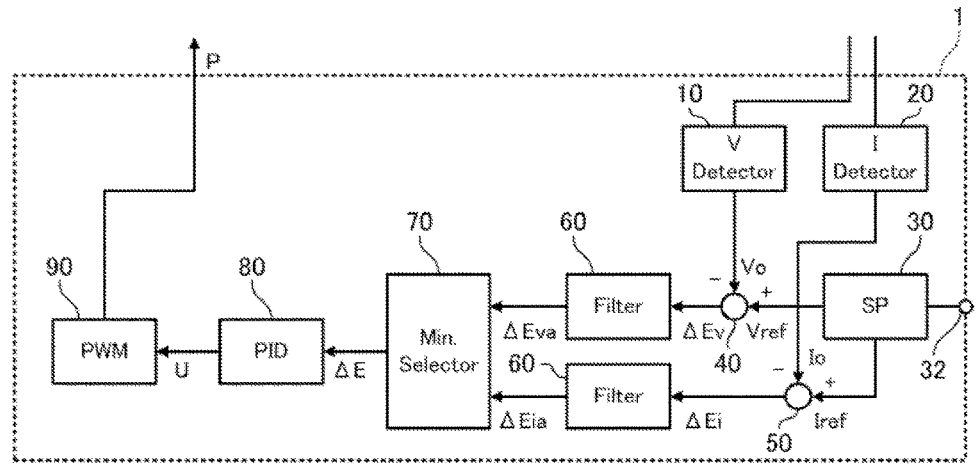
Figure 4C:
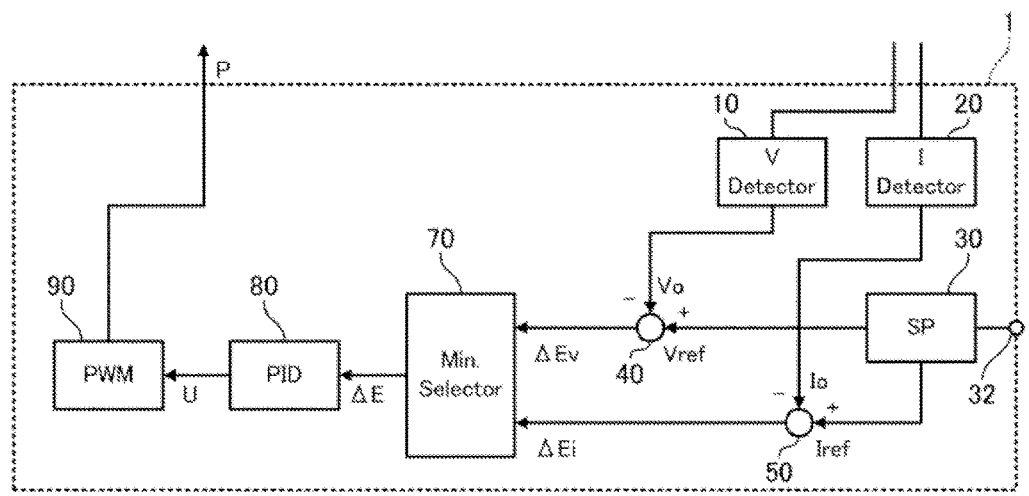
Figure 5:
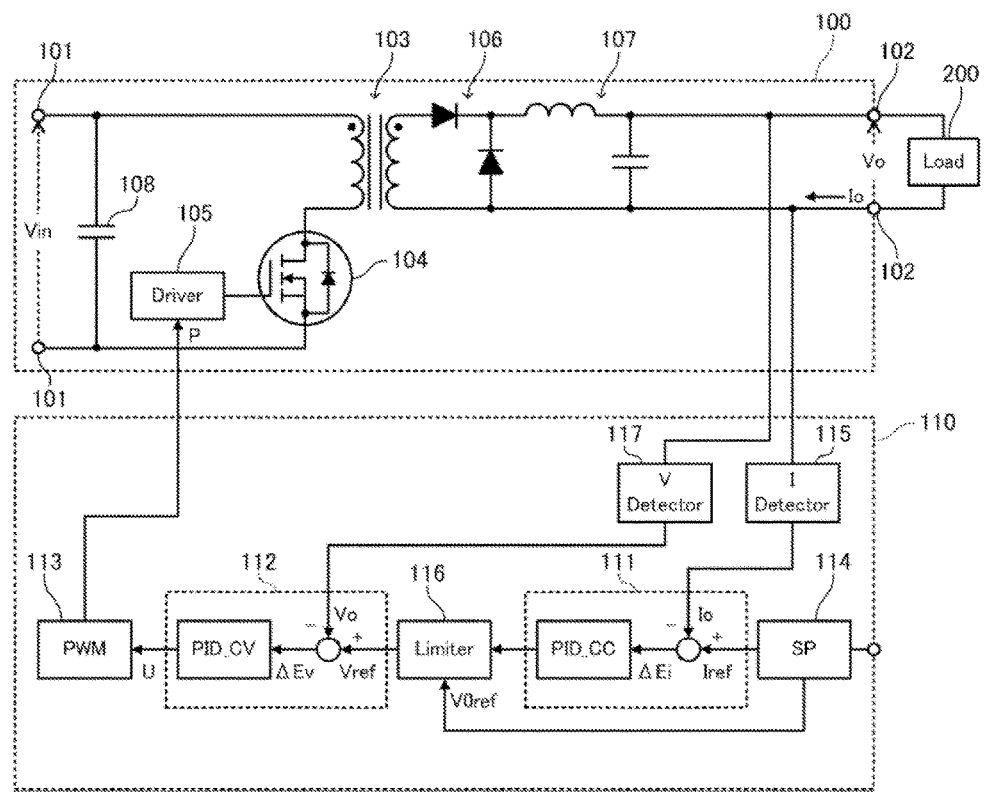
FIG. 5 is a block diagram showing an example of a configuration of a conventional CV control minor loop/CC control major loop cascade system.
Figure 6:
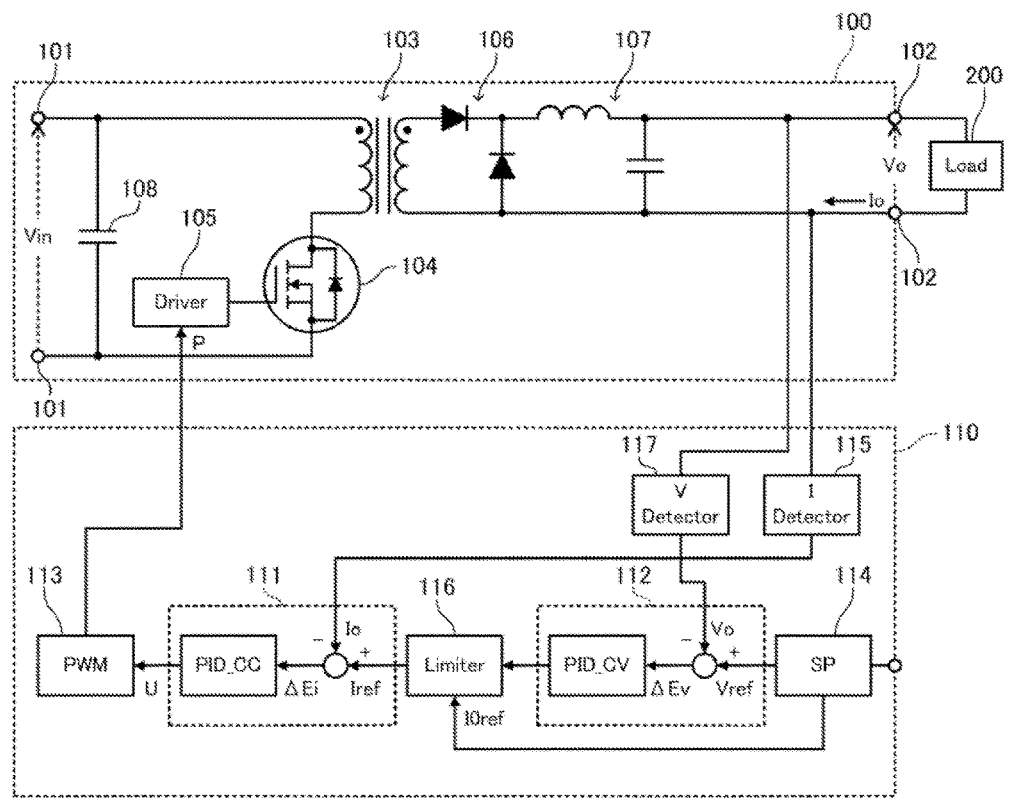
FIG. 6 is a block diagram showing an example of a configuration of a conventional CC control minor loop/CV control major loop cascade system.
Figure 7:
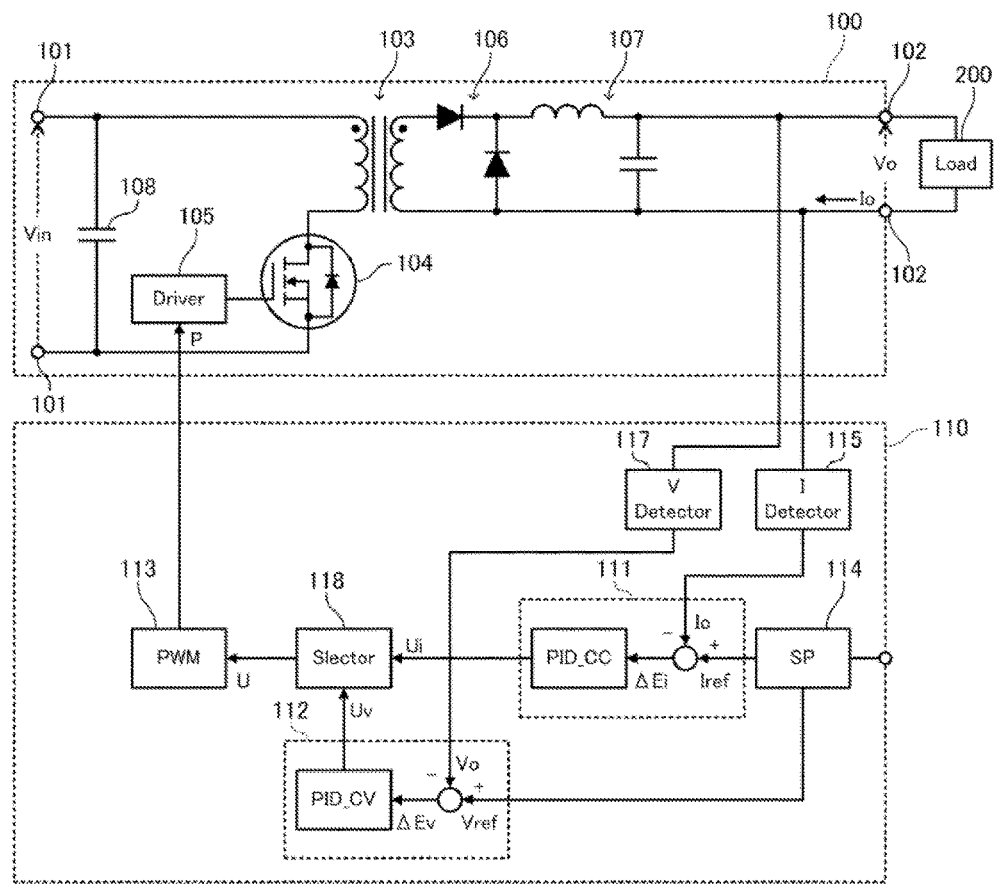
FIG. 7 is a block diagram showing an example of a configuration of a conventional parallel control system.

Next, other modes of the control device 1 will be described. FIGS. 4A to 4C are block diagrams showing examples of other modes of the control device 1. In FIGS. 4A to 4C, the depiction of the power supply device 100 is omitted.

FIG. 4A shows a case where the filter unit 60 is arranged between the voltage difference value generation unit 40 and the difference value selection unit 70. In such an example, the filter unit 60 applies predetermined arithmetic processing to the voltage difference value ΔEv to generate an adjusted voltage difference value ΔEva. The difference value selection unit 70 compares the adjusted voltage difference value ΔEva with the current difference value ΔEi, and selects the smaller one as the control difference value ΔE. In such a case, the operation amount generation unit 80 can be optimized for the CC control. This enables more stable control depending on the specifications, intended use, and the like of the power supply device 100. The control device 1 can be constructed by utilizing an existing PID controller for CC control etc.

FIG. 4B shows a case where filter units 60 are arranged both between the voltage difference value generation unit 40 and the difference value selection unit 70 and between the current difference value generation unit 50 and the difference value selection unit 70. In such an example, the two filter units 60 generate the adjusted voltage difference value ΔEva and the adjusted current different value ΔEia, respectively. The difference value selection unit 70 compares the adjusted voltage difference value ΔEva with the adjusted current difference value ΔEia, and selects the smaller one as the control difference value ΔE. In such a case, the gains and phases in the CV control and the CC control can be more finely adjusted. This enables more stable control depending the specifications, intended use, and the like of the power supply device 100. The control device 1 can also be improved in versatility.

FIG. 4C shows a case where the filter unit 60 is omitted. In such an example, the difference value selection unit 70 simply compares the voltage difference value ΔEv with the current difference value ΔEi, and selects the smaller one as the control difference value ΔE. Depending on the specifications, intended use, and the like of the power supply device 100, the responsiveness of the CV control and CC control may be able to be adjusted by adjusting the level conversion of the output voltage detection unit 10 or the output current detection unit 20 and/or adjusting resolution of digitization. In such a case, the filter unit 60 can be omitted to simplify the control device 1 for cost reduction.

The control device 1 compares the magnitudes of the two difference values, whether positive or negative. Even in cases such as when the voltage difference value $\Delta Ev$ varies largely to negative values during the CV control and when the current difference value $\Delta Ei$ varies largely to negative values during the CC control, the control is thus less likely to be switched. That is, the control device 1 can provide stability higher than heretofore even if the filter unit 60 is omitted.

Although omitted in the drawings, the control device 1 may be composed of analog circuits.

If the control device 1 is composed of analog circuits, the voltage difference value generation unit 40 and the current difference value generation unit 50 may include a differential amplifier circuit, for example. A function similar to that of the filter unit 60 can also be implemented by a differential amplifier circuit or the like. The difference value selection unit 70 may be composed of, for example, a so-called diode OR circuit which is formed by connecting the cathodes of two diodes to each other. In such a case, the voltage difference values $\Delta Ev$ and the adjusted current difference value $\Delta Eia$ can be input to the anodes of the two diodes, respectively, and the control difference value $\Delta E$ can be output from the connection node of the cathodes. The operation amount generation unit 80 can be composed of existing various arithmetic circuits such as a proportional circuit, an integral circuit, and a differential circuit, or a combination of these. The driving pulse generation unit 90 may be composed of, for example, a triangular wave generation circuit and a comparator.

The control device 1 may be integrally arranged with the power supply device 100. The control device 1 may be arranged separate from the power supply device 100. It will be understood that the arrangement and configuration of various units in the control device 1 are not limited in particular.

As has been described above, the control device 1 according to the present embodiment includes: the output voltage detection unit 10 which detects the output voltage value Vo of the power supply device 100; a voltage target value setting unit (target value setting unit 30) which sets the voltage target value Vref serving as a target of the output voltage value Vo; the voltage difference value generation unit 40 which subtracts the output voltage value Vo from the voltage target value Vref to generate the voltage difference value $\Delta Ev$; the output current detection unit 20 which detects the output current value Io of the power supply device 100; a current target value setting unit (target value setting unit 30) which sets the current target value Iref serving as a target of the output current value Io; the current difference value generation unit 50 which subtracts the output current value Io from the current target value Iref to generate the current difference value $\Delta Ei$; the difference value selection unit 70 which compares the voltage difference value $\Delta Ev$ or a value (adjusted voltage difference value $\Delta Eva$) based on the voltage difference value $\Delta Ev$ with the current difference value $\Delta Ei$ or a value (adjusted current difference value $\Delta Eia$) based on the current difference value $\Delta Ei$, and selects the smaller one as the control difference value $\Delta E$; and the operation amount generation unit 80 which generates the operation amount U for controlling the power supply device 100 on the basis of the control difference value $\Delta E$.

A control method according to the present embodiment includes: output voltage detection processing for detecting the output voltage value Vo of the power supply device 100; voltage target value setting processing for setting the voltage target value Vref serving as a target of the output voltage value Vo; voltage difference value generation processing for subtracting the output voltage value Vo from the voltage target value Vref to generate the voltage difference value $\Delta Ev$; output current detection processing for detecting the output current value Io of the power supply device 100; current target value setting processing for setting the current target value Iref serving as a target of the output current value Io; current difference value generation processing for subtracting the output current value Io from the current target value Iref to generate the current difference value $\Delta Ei$; difference value selection processing for comparing the voltage difference value $\Delta Ev$ or a value (adjusted voltage difference value $\Delta Eva$) based on the voltage difference value $\Delta Ev$ with the current difference value $\Delta Ei$ or a value (adjusted voltage difference value $\Delta Eia$) based on the current difference value $\Delta Ei$, and selecting the smaller one as the control difference value $\Delta E$; and operation amount generation processing for generating the operation amount U for controlling the power supply device 100 on the basis of the control difference value $\Delta E$.

With such a simple configuration in which the CV control and the CC control are performed by using one operation amount generation unit 80, stable CVCC control can be performed with appropriate responsiveness.

The control device 1 includes the filter unit 60 which applies predetermined arithmetic processing to the current difference value $\Delta Ei$ to generate the adjusted current difference value $\Delta Eia$. The difference value selection unit 70 compares the voltage difference value $\Delta Ev$ with the adjusted current difference value $\Delta Eia$. Such a configuration can provide appropriate responsiveness of the CV control and the CC control and prevent mutual interference between the two controls to enable stable CVCC control even if one operation amount generation unit 80 is used to perform the CV control and the CC control. In addition, the control device 1 can be constructed at low cost by utilizing an existing PID controller and the like.

The control device 1 may include a filter unit 60 that applies predetermined arithmetic processing to the voltage difference value $\Delta Ev$ to generate the adjusted voltage difference value $\Delta Eva$. The difference value selection unit 70 may compare the adjusted voltage difference value $\Delta Eva$ with the current difference value $\Delta Ei$. Even in such a case, the control device 1 of simple configuration can perform stable CVCC control while securing appropriate responsiveness. The control device 1 can be constructed at low cost by utilizing an existing PID controller and the like.

The control device 1 may include a filter unit 60 that applies predetermined arithmetic processing to the voltage difference value $\Delta Ev$ and the current difference value $\Delta Ei$ to generate the adjusted voltage difference value $\Delta Eva$ and the adjusted current difference value $\Delta Eia$. The difference value selection unit 70 may compare the adjusted voltage difference value $\Delta Eva$ with the adjusted current difference value $\Delta Eia$. Even in such a case, the control device 1 of simple configuration can perform stable CVCC control while securing appropriate responsiveness.

The filter unit 60 includes at least any one of the gain compensator 62 for multiplying a predetermined gain, the phase compensator 64 for compensating a phase, and the gain adjuster 66 for adjusting a gain. In such a manner, the gain and phase in the CC control or CV control can be appropriately adjusted to provide appropriate responsiveness. The balance between the magnitude of the voltage difference value ΔEv or the adjusted voltage difference value ΔEva and that of the current difference value ΔEi or the adjusted current difference value ΔEia can be appropriately adjusted to improve the stability of the CVCC control.

The gain adjuster 66 is configured to perform different types of gain compensation depending on the magnitude of the input value (secondary adjusted current difference value ΔEi2). The responsiveness of the CC control or CV control and the balance between the difference values for the difference value selection unit 70 to compare can thus be more appropriately adjusted.

The difference value selection unit 70 may compare the voltage difference value ΔEv with the current difference value ΔEi. This can further simplify the configuration of the control device 1 for further cost reduction.

The operation amount generation unit 80 is preferably configured to generate the operation amount U by a control system having at least one of the characteristics of a proportional operation, an integral operation, and a differential operation.
This enables easy and stable CVCC control.

The embodiment of the present invention has been described above. It will be understood that the control device and the control method for power supply devices according to the present invention are not limited to the foregoing embodiment, and various modifications may be made without departing from the gist of the present invention. The operation and effects described in the foregoing embodiment are merely a list of most suitable operation and effects resulting from the prevent invention. The operation and effects of the present invention are not limited thereto.

The control device for a power supply device and the control method for a power supply device according to the present invention may be used in the field of various types of electric and electronic equipment.

The disclosure of Japanese Patent Application No. 2015-133461 filed Jul. 2, 2015 including the specification, claims, drawings, and summary is expressly incorporated herein by reference in its entirety.

What is claimed is:

1. A control device for a power supply device, the control device comprising:
    an output voltage detection unit configured to detect an output voltage value of the power supply device;
    a voltage target value setting unit configured to set a voltage target value serving as a target of the output voltage value;
    a voltage difference value generation unit configured to subtract the output voltage value from the voltage target value to generate a voltage difference value;
    an output current detection unit configured to detect an output current value of the power supply device;
    a current target value setting unit configured to set a current target value serving as a target of the output current value;
    a current difference value generation unit configured to subtract the output current value from the current target value to generate a current difference value;
    a difference value selection unit configured to compare one of the voltage difference value and an adjusted voltage difference value based on the voltage difference value with one of the current difference value and an adjusted current difference value based on the current difference value, and selecting a smaller one as a control difference value; and
    an operation amount generation unit configured to generate an operation amount for controlling the power supply device based on the control difference value.

2. The control device for a power supply device according to claim 1, further comprising:
    a filter unit configured to apply predetermined arithmetic processing to the current difference value to generate the adjusted current difference value,
    wherein the difference value selection unit compares the voltage difference value with the adjusted current difference value.

3. The control device for a power supply device according to claim 1, further comprising:
    a filter unit configured to apply predetermined arithmetic processing to the voltage difference value to generate the adjusted voltage difference value,
    wherein the difference value selection unit compares the adjusted voltage difference value with the current difference value.

4. The control device for a power supply device according to claim 1, further comprising:
    a filter unit configured to apply predetermined arithmetic processing to the voltage difference value and the current difference value to generate the adjusted voltage difference value and the adjusted current difference value, respectively,
    wherein the difference value selection unit compares the adjusted voltage difference value with the adjusted current difference value.

5. The control device for a power supply device according to claim 2,
    wherein the filter unit includes at least one of a gain compensator configured to multiply a predetermined gain, a phase compensator configured to compensate a phase, and a gain adjuster configured to adjust a gain.

6. The control device for a power supply device according to claim 3,
    wherein the filter unit includes at least one of a gain compensator configured to multiply a predetermined gain, a phase compensator configured to compensate a phase, and a gain adjuster configured to adjust a gain.

7. The control device for a power supply device according to claim 4,
    wherein the filter unit includes at least one of a gain compensator configured to multiply a predetermined gain, a phase compensator configured to compensate phase, and a gain adjuster configured to adjust a gain.

8. The control device for a power supply device according to claim 5,
    wherein the gain adjuster performs different types of gain compensation depending on a magnitude of an input value.

9. The control device for a power supply device according to claim 6,
    wherein the gain adjuster performs different types of gain compensation depending on a magnitude of an input value.

10. The control device for a power supply device according to claim 7,
    wherein the gain adjuster performs different types of gain compensation depending on a magnitude of an input value.

11. The control device for a power supply device according to claim 1, wherein the difference value selection unit compares the voltage difference value with the current difference value.

12. The control device for a power supply device according to claim 1,
wherein the operation amount generation unit is configured to generate the operation amount by a control system having at least one of characteristics of a proportional operation, an integral operation, and a differential operation.

13. The control device for a power supply device according to claim 2,
wherein the operation amount generation unit is configured to generate the operation amount by a control system having at least one of characteristics of a proportional operation, an integral operation, and a differential operation.

14. The control device for a power supply device according to claim 3,
wherein the operation amount generation unit is configured to generate the operation amount by a control system having at least one of characteristics of a proportional operation, an integral operation, and a differential operation.

15. The control device for a power supply device according to claim 4,
wherein the operation amount generation unit is configured to generate the operation amount by a control system having at least one of characteristics of a proportional operation, an integral operation, and a differential operation.

16. The control device for a power supply device according to claim 5,
wherein the operation amount generation unit is configured to generate the operation amount by a control system having at least one of characteristics of a proportional operation, an integral operation, and a differential operation.

17. The control device for a power supply device according to claim 6,
wherein the operation amount generation unit is configured to generate the operation amount by a control system having at least one of characteristics of a proportional operation, an integral operation, and a differential operation.

18. The control device for a power supply device according to claim 7,
wherein the operation amount generation unit is configured to generate the operation amount by a control system having at least one of characteristics of a proportional operation, an integral operation, and a differential operation.

19. The control device for a power supply device according to claim 11,
wherein the operation amount generation unit is configured to generate the operation amount by a control system having at least one of characteristics of a proportional operation, an integral operation, and a differential operation.

20. A control method for a power supply device, the control method comprising:
output voltage detection processing for detecting an output voltage value of the power supply device;
voltage target value setting processing for setting a voltage target value serving as a target of the output voltage value;
voltage difference value generation processing for subtracting the output voltage value from the voltage target value to generate a voltage difference value;
output current detection processing for detecting an output current value of the power supply device;
current target value setting processing for setting a current target value serving as a target of the output current value;
current difference value generation processing for subtracting the output current value from the current target value to generate a current difference value;
difference value selection processing for comparing one of the voltage difference value and an adjusted voltage difference value based on the voltage difference value with one of the current difference value and an adjusted current difference value based on the current difference value, and selecting a smaller one as a control difference value; and
operation amount generation processing for generating an operation amount for controlling the power supply device based on the control difference value.

* * * * *